(12) United States Patent
Albrecht et al.

(10) Patent No.: US 6,798,590 B2
(45) Date of Patent: Sep. 28, 2004

(54) METHOD FOR CONTACT MAGNETIC TRANSFER OF SERVO PATTERN TO HARD MAGNETIC RECORDING DISK

(75) Inventors: Thomas R. Albrecht, San Jose, CA (US); Zvonimir Z. Bandic, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 424 days.

(21) Appl. No.: 10/055,638

(22) Filed: Jan. 22, 2002

(65) Prior Publication Data

US 2003/0137763 A1 Jul. 24, 2003

(51) Int. Cl.$^7$ .................................................. G11B 5/86
(52) U.S. Cl. ............................. 360/16; 360/17; 360/15
(58) Field of Search ............................... 360/16, 17, 15

(56) References Cited

U.S. PATENT DOCUMENTS

| | | | |
|---|---|---|---|
| 3,869,711 A | | 3/1975 | Bernard et al. |
| 6,469,848 B1 | * | 10/2002 | Hamada et al. ............... 360/17 |
| 6,587,289 B2 | * | 7/2003 | Nishikawa et al. ........... 360/15 |
| 6,643,079 B1 | * | 11/2003 | Komatsu et al. .............. 360/17 |
| 6,650,490 B2 | * | 11/2003 | Nishikawa .................... 360/17 |
| 6,678,101 B2 | * | 1/2004 | Nishikawa et al. ........... 360/15 |

OTHER PUBLICATIONS

Sugita, R. et al., "A novel magnetic contact duplication technique for servo–writing on magnetic disks", IEEE Transactions on Magnetics, vol. 36 Issue 5 Part 1, Sept 2000, pp 2285–2287.

Nishikawa, M. et al., "Readback properties of novel magnetic contact duplication of high recording density floppy disk", IEEE Transactions on Magnetics, vol. 36 Issue 5 Part 1, Sept 2000, pp 2288–2290.

Ishida, T. et al., "Printed Media technology for an effective and inexpensive servo track writing of HDDs", IEEE Transactions on Magnetics, vol. 37 Issue 4 Part 1, Jul. 2001, pp 1875–1877.

Saito, A. et al., "Optimization of a magnetic printing process by computer simulation", IEEE Transactions on Magnetics, vol. 37 Issue 4 Part 1, Jul. 2001, pp. 1389–1392.

* cited by examiner

*Primary Examiner*—David Hudspeth
*Assistant Examiner*—Natalia Figueroa
(74) *Attorney, Agent, or Firm*—Thomas R. Berthold

(57) ABSTRACT

A contact magnetic transfer method for forming a pattern of magnetized servo regions in the magnetic recording layer of a rigid magnetic recording disk uses a flexible master disk and a differential gas pressure to press the patterns of the master disk against the slave disk. The master disk is a flexible plastic film with islands of magnetic shielding material extending above the film surface, the islands forming a pattern representative of the servo pattern to be formed in the recording layer of the disk. The plastic film is sealed at the outer periphery of the opening of a pressure chamber with the islands located outside the chamber. The previously DC-magnetized slave disk is brought into gentle contact with the islands and gas pressure inside the chamber is increased to slightly above atmospheric. This controlled pressure presses the islands into contact with the slave disk, at which time a magnet magnetizes the regions of the recording layer not aligned with the islands in the direction opposite to the original DC-magnetized direction. The magnet is located on a rotatable stage within the chamber beneath the plastic film and mounted so that the length of the gap is in the radial direction corresponding to the radius of the slave disk.

19 Claims, 6 Drawing Sheets

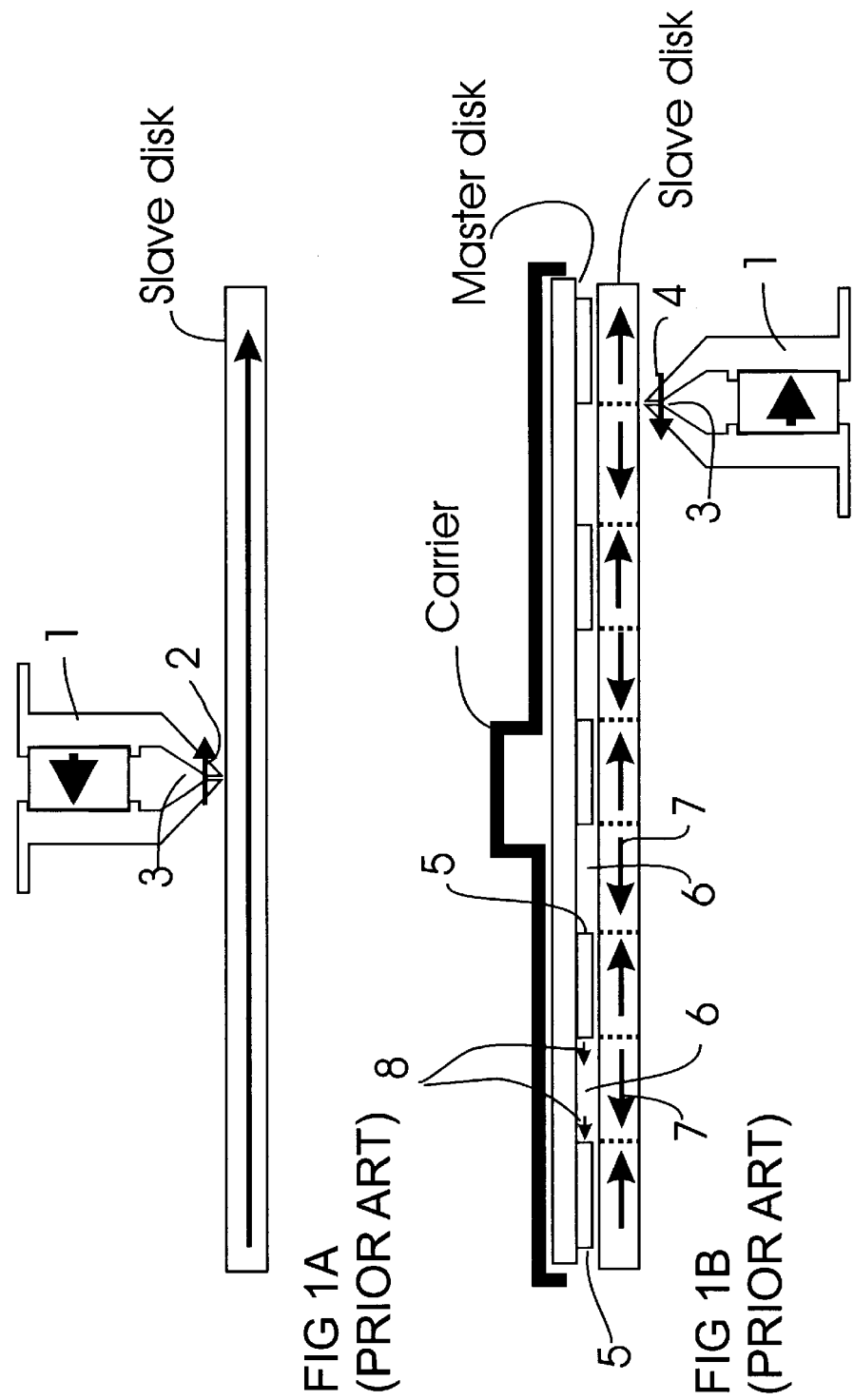

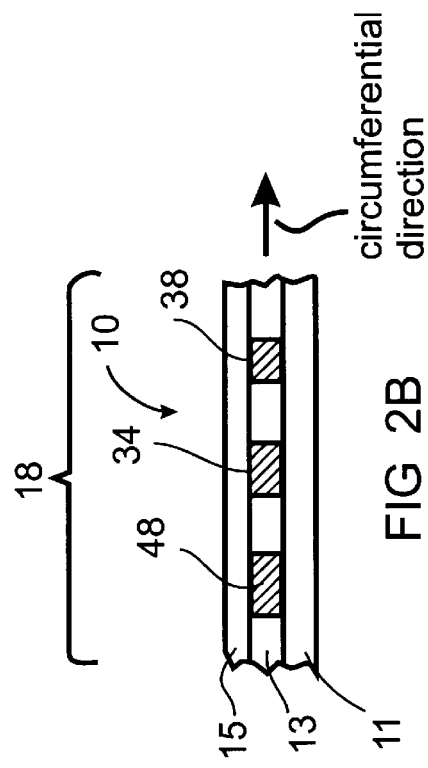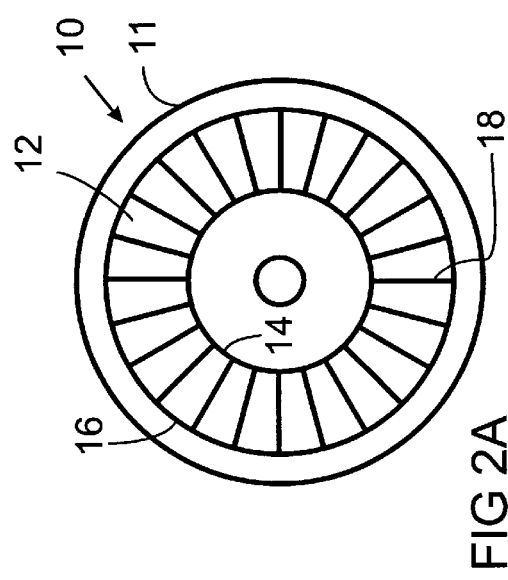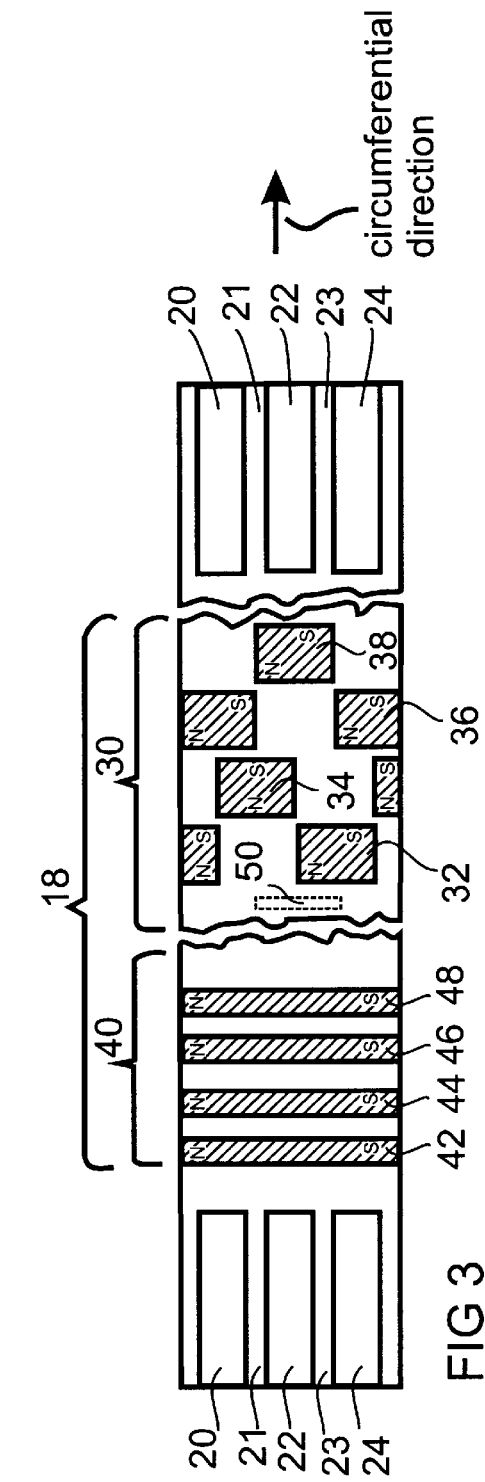

METHOD FOR CONTACT MAGNETIC TRANSFER OF SERVO PATTERN TO HARD MAGNETIC RECORDING DISK

TECHNICAL FIELD

The invention relates to a method of forming a servo pattern on a rigid magnetic recording disk, and more particularly to contacting the recording disk with a magnetic pattern on a master disk and transferring the pattern to the recording disk.

BACKGROUND OF THE INVENTION

In magnetic recording hard disk drives, the conventional method of generating the fixed, pre-recorded servo patterns that are used to position the recording head to the desired track and record location on the disk, is by "servo-writing" the patterns on a track by track basis, either with a special write head and servo-writer or with the production head in the drive. This is a time-consuming and therefore expensive process. Contact magnetic duplication or transfer, sometimes referred to as magnetic printing, is a method of instantaneous recording of magnetic transitions or patterns onto magnetic media over large areas and has been proposed for transferring servo patterns to magnetic recording disks in hard disk drives. The contact magnetic transfer method uses a "master" disk with a pattern of soft (low-coercivity) magnetic material corresponding to the servo pattern which is to be transferred to the magnetic recording disk (the "slave" disk). As shown in FIGS. 1A–1B, the slave disk is first DC magnetized or "erased" with a magnet 1 that applies an in-plane horizontal (longitudinal) magnetic field in first direction 2 across a gap 3 between the magnet's poles, as shown in FIG. 1A. A rigid master disk supported on a carrier is then pressed into contact with the DC-erased slave disk, and a second horizontal DC magnetic field is applied by magnet 1 in the direction 4 opposite to the direction 2 of the first DC magnetization. This produces a magnetization pattern on the slave disk because the first magnetization on the slave disk is shielded from the second DC field in the regions where the islands 5 of soft magnetic material of the master disk are present, and the first magnetization on the slave disk is reversed in the regions beneath the openings 6 in the pattern (the regions between the soft magnetic material on the master disk), as shown by arrows 7 in FIG. 1B. The magnetic field applied to the slave disk beneath the openings 6 is enhanced by the dipole fields 8 in the soft magnetic regions adjacent the openings 6, because in the presence of the field from the magnet these regions generate their own fields.

Contact magnetic transfer was first proposed for generating servo patterns in magnetic recording media in IBM's U.S. Pat. No. 3,869,711. The '711 patent is directed primarily to transferring servo patterns to flexible tape from a rigid master drum or to flexible disks from a rigid master disk, but suggests that the master disk may be "flexible" and the slave disk "rigid". More recently, contact magnetic transfer and the readback properties of the transferred or printed servo patterns have been studied by Sugita, R. et al., "A novel magnetic contact duplication technique for servo-writing on magnetic disks", *IEEE Transactions on Magnetics*, Vol 36 Issue 5 Part 1, September 2000, pp 2285–2287; Nishikawa, M. et al., "Readback properties of novel magnetic contact duplication of high recording density floppy disk", *IEEE Transactions on Magnetics*, Vol 36 Issue 5 Part 1, September 2000, pp 2288–2290; Ishida, T. et al., "Printed Media technology for an effective and inexpensive servo track writing of HDDs", *IEEE Transactions on Magnetics*, Vol 37 Issue 4 Part 1, July 2001, pp 1875–1877; and Saito, A. et al., "Optimization of a magnetic printing process by computer simulation", *IEEE Transactions on Magnetics*, Vol 37 Issue 4 Part 1, July 2001, pp. 1389–1392.

One of the most challenging problems in contact magnetic transfer is achieving the precise level of contact or close proximity between the master and slave disks. If the master and slave disks are too far apart, the servo patterns will not be reliably reproduced. If they are pressed together with excessive force, one or the other may be damaged or the master disk may wear out too quickly, thereby increasing the cost of the servo patterning process. This problem is further complicated because the surface of a typical hard disk to be patterned is not perfectly flat, but exhibits asperities and a curvature that can vary over a relatively wide range. Moreover, the curvature can vary considerably from disk to disk.

What is needed is a method for contact magnetic transfer of servo patterns to hard magnetic recording disks that is reliable, does not damage the disks, and allows for patterning of a large number of disks from a single master disk.

SUMMARY OF THE INVENTION

The invention is a contact magnetic transfer method for forming a pattern of magnetized servo regions in the magnetic recording layer of a rigid magnetic recording disk that uses a flexible master disk and a differential gas pressure to press the patterns of the master disk against the slave disk. The master disk is a flexible plastic film with islands of magnetic shielding material extending above the film surface, the islands forming a pattern representative of the servo pattern to be formed in the recording layer of the disk. The plastic film is sealed at the outer periphery of the opening of a pressure chamber with the islands located outside the chamber. The previously DC-magnetized slave disk is brought into gentle contact with the islands and gas pressure inside the chamber is increased to slightly above atmospheric. This controlled pressure presses the islands into contact with the slave disk, at which time a magnet magnetizes the regions of the recording layer of the slave disk that are not aligned with the islands in the direction opposite to the original DC-magnetized direction. The magnet is located on a rotatable stage within the chamber beneath the plastic film and mounted so that the length of its gap is in the radial direction corresponding to the radius of the slave disk.

For a fuller understanding of the nature and advantages of the present invention, reference should be made to the following detailed description taken together with the accompanying figures.

BRIEF DESCRIPTION OF THE DRAWING

FIGS. 1A–1B depict the prior art of contact magnetic transfer.

FIGS. 2A–2B are a plan view and partial sectional view, respectively, of a hard magnetic recording disk illustrating a pattern of servo sectors extending generally radially across an annular data band.

FIG. 3 is an expanded view of one of the servo sectors of FIG. 2A showing the magnetized servo blocks.

DETAILED DESCRIPTION OF THE INVENTION

Figure 4:
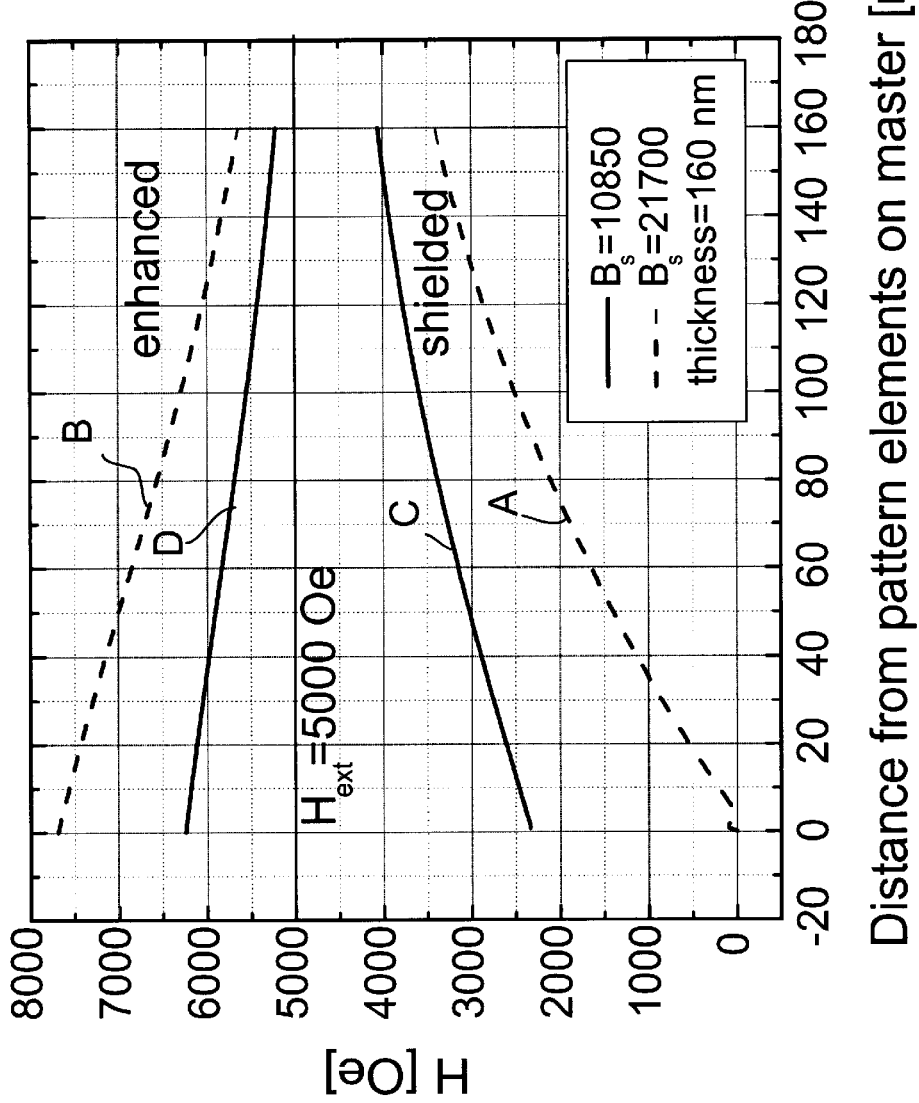
FIG. 4 is a graph of magnetic field applied in the recording layer of the disk as a function of distance between the outer surface of the disk and the islands on the master disk, for a fixed external field, for islands made with two different magnetic materials.

A rigid magnetic recording disk with a servo pattern formed by contact magnetic transfer is shown in the plan view FIG. 2A and the sectional view FIG. 2B. The magnetic recording disk 10 comprises a rigid substrate 11 (e.g., glass), a thin film metal alloy (e.g., CoPtCrB) magnetic recording layer 13 on the substrate and an outer layer 15 (e.g., a protective amorphous carbon overcoat, which typically has a lubricant, such as perfluoropolyether (PFPE), on its surface). The disk 10 has an annular data portion or band 12 which is defined by an inside diameter (ID) 14 and an outside diameter (OD) 16. Interspersed about the data band are equally angularly spaced servo sectors, such as typical servo sector 18. The servo sectors have a curved or arcuate shape from ID to OD because they are typically written by a write head on a rotary actuator that follows an arcuate path from ID to OD, but they are represented as straight radial lines in FIG. 2A for ease of illustration. The sectional view of FIG. 2B is taken along the track or circumferential direction and shows substrate 11, recording layer 13 with typical magnetized portions 48, 34, 38 making up part of the servo pattern, and outer layer 15. During operation of the disk drive, the head reads or writes data on a selected one of a number of concentric data tracks located between the ID 14 and OD 16 of the annular data band 12. To accurately read or write data from a selected track, the head is required to be maintained over the centerline of the track. Accordingly, each time one of the servo sectors, such as typical sector 18, passes beneath the head, the disk drive's head positioning control system receives servo information from the servo blocks contained within the servo sector. The information contained in the servo blocks generates a position error signal which is used by the head positioning control system to move the head towards the track centerline. Thus, during a complete rotation of the disk 10, the head is continually maintained over the track centerline by servo information from the servo blocks in successive servo sectors.

An expanded view of typical servo sector 18 and portions of three data tracks are illustrated in FIG. 3. The three data tracks 20, 22, 24 are shown in outline. All of the shaded portions of FIG. 3 represent magnetized regions of the recording layer 13 that have been patterned by a contact magnetic transfer process. The "N" and "S" indicate the poles for each magnetized region. The non-shaded portions on FIG. 3 represent the regions of recording layer 13 that retain their original DC magnetization. A portion of the servo sector 18 is a servo field 30 that includes spaced-apart servo blocks, such as typical servo blocks 32, 34 and 36, 38. Also included in servo sector 18 is a field 40 of radial stripes 42, 44, 46, 48 that are used to provide synchronization and gain control for the subsequently read servo signals from servo blocks 32, 34 and 36, 38. Additional information, e.g., timing marks indicating the beginning of a servo sector and/or a coded pattern for identifying the specific servo track by track number, may also be included in servo sector 18. The servo blocks 32, 34 and 36, 38 in servo field 30 and the radial stripes 42–48 in the synchronization/gain field 40 are DC magnetized in the track or circumferential direction of the disk, as indicated by the designations "N" and "S" in FIG. 3.

One of the problems in the contact magnetic transfer method of forming the servo patterns is achieving the required contact between the master disk and the recording disk without producing damage to either one. The importance of contact or close proximity between the pattern elements or islands on the master disk and the recording layer of the slave disk can be understood by reference to FIG. 4, which shows the magnetic field applied in the recording layer of the slave disk as a function of distance between the outer surface of the slave disk and the islands on the master disk for a fixed external field of 5000 Oe. The dashed "shielded" line A is the field next to the soft magnetic pattern islands (where the field is shielded and therefore reduced), and the dashed "enhanced" line B is the field next to the openings between the pattern islands where the magnetic field is enhanced due to the dipole fields from the pattern islands. Lines A and B are for the example where the islands are formed of a soft magnetic material with a higher saturation field, such as $Ni_{20}Fe_{80}$ that has a magnetization saturation $B_S$ of 21700 Gauss, and lines C and D are for the example where the islands are formed of permalloy ($Ni_{80}Fe_{20}$) that has $B_S=10850$ Gauss. The thickness of the pattern islands was 160 nm. As shown by FIG. 4, for distances close to the master disk the shielded field is much smaller (e.g., 500 Oe at 20 nm) than the external field (5000 Oe), but the enhanced field is much larger (e.g., 7500 Oe at 20 nm). It is desirable to have the difference between the enhanced and shielded fields as large as possible to assure that all of the regions of the recording layer of the slave disk adjacent the pattern islands of the master disk are magnetized, and that none of the other regions of the recording layer are magnetized. The use of soft magnetic material with larger saturation field (for example FeCo alloys or high-Fe NiFe alloys) will increase this field difference. This field difference can also be increased by increasing the thickness of the pattern islands. The soft magnetic material of the pattern islands has a coercivity less than approximately 20 Oe and is preferably formed of an alloy of one or more of Ni, Fe and Co.

Figure 5:
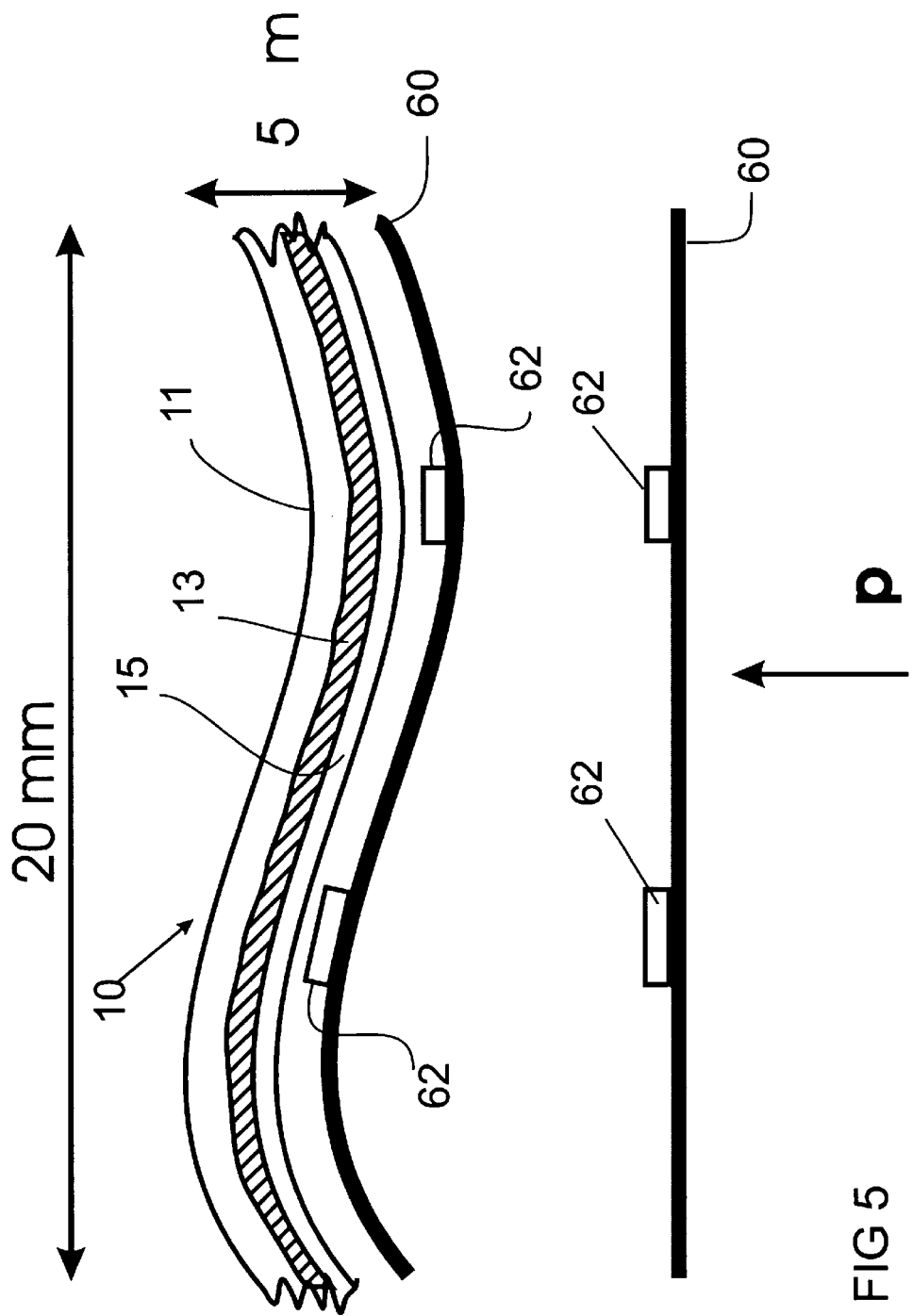
FIG. 5 is an illustration of the present method of contacting the recording disk with the pattern of islands by using a flexible sheet to conform to the curvature of the disk.

The problem of close proximity between the recording disk and the pattern islands of the master disk becomes more difficult because the recording disk is not flat, but rather can exhibit a curvature with a peak-to-peak variation in the axial direction (perpendicular to the disk surface) of 5 microns over a 20 mm range or period and 0.25 microns over a 4 mm period. In the present invention, as depicted in FIG. 5, the master disk comprises a flexible sheet 60 with islands 62 of soft magnetic material, and a small differential gas pressure ΔP is applied to the flexible sheet 60 to press the islands 62 into contact with the outer surface of the recording disk 10 so that the master disk has substantially the same curvature as the recording disk.

Method for Contact Magnetic Transfer using Differential Gas Pressure

Figure 6B:
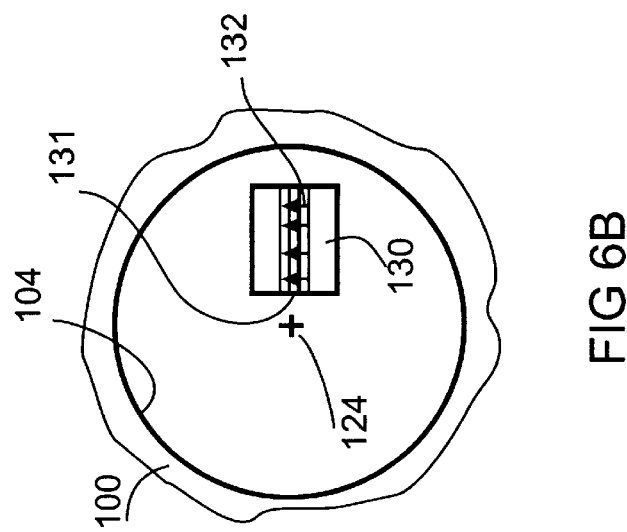
FIGS. 6A–6B are side sectional and top views, respectively, of the apparatus used in the method of the present invention.
Figure 6A:
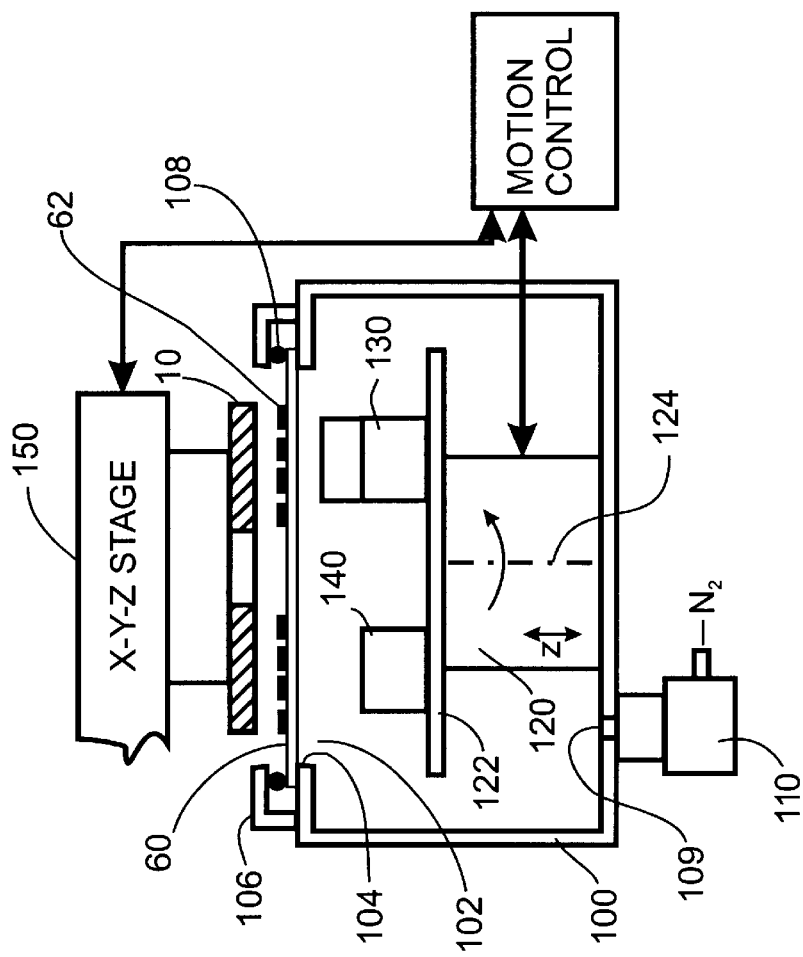

The apparatus for contact magnetic transfer for use in the method of the present invention is shown in FIGS. 6A–6B. A chamber 100 has an upper opening 102 with an outer periphery 104. The opening 102 is covered by flexible sheet 60 with pattern islands 62. The chamber opening 102 is sealed by clamp 106 and O-ring 108. The interior of chamber 100 has an inlet 109 connected to pressure regulator 110 which is connected to a pressurized nitrogen source. A rotation stage 120 is located inside chamber 100 and supports a platform 122 that rotates about an axis 124. A permanent magnet 130 and a counterweight 140 for magnet 130 are mounted off-axis on the platform 122. As shown in the top view of FIG. 6B with the sheet 60 removed, the magnet 130 has its gap 131 extending along a radius of platform 122, with the field lines 132 shown oriented in a generally circular direction so that the recording disk will be magnetized in the track direction. The gap 131 has a radial length sufficient to magnetize the annular data band of disk 10. Although not shown in FIG. 6B, the gap of the magnet can also have a curved shape from ID to OD so that the servo sectors have an arcuate shape that matches the arcuate path of the rotary actuator. The stage 120 is also movable in the vertical Z-direction parallel to the axis 124 so that magnet 130 can be positioned at the desired distance from sheet 60. The recording disk 10 to be patterned is mounted on a gripper arm 150 that is movable in the X-Y-Z directions above the sheet 60. The movement of the gripper arm 150 and stage 120 is controlled by a motion controller, typically a PC.

To begin the contact magnetic transfer of the servo patterns to the recording disk 10 the previously DC-erased disk 10 is positioned and centered over sheet 60 by movable gripper arm 150. The disk 10 has been DC-magnetized in the direction opposite to arrows 132 (FIG. 6B) in a separate manufacturing station. The disk 10 is positioned in the Z-direction so that its outer surface gently touches the pattern islands 62 on sheet 60. Next, the pressure regulator 110 is used to increase the pressure within chamber 100 slightly above atmospheric to move the sheet 60 outward so that the islands 62 are pressed into contact with the outer surface of disk 10. While initial gentle contact of the outer surface of the disk 10 with the islands 62 is preferred, the disk 10 can be positioned to be in very close proximity, but not in contact or in only partial contact with some of the islands, so long as the disk is close enough that the pressure differential moves the islands 62 to press them into full contact. The pressure within the chamber and the flexibility of the sheet allows the islands 62 to follow the contour of the outer surface of the disk 10. The magnet 130 is moved in the Z-direction to the desired distance from sheet 60. This distance depends on the field strength of magnet 130, the thickness of the plastic sheet 60, the material and thickness of the pattern islands 62 and the material in the recording layer of disk 10. For example, if the magnet is a 10 MGOe (mega Gauss-Oersted) NiFeB permanent magnet with a 1.1 mm gap width, and the plastic sheet is a 127 micron thick polyethylate terephtalate (PET) film with 300 nm thick pattern islands formed of $Ni_{32}Fe_{68}$, then this distance is selected to be about 0.57 mm. The stage 120 is then rotated and the magnet 130 applies the field 132 to the annular data band on the disk 10. This reverses the magnetization in the annular data band in those regions of the recording layer that are not shielded by the pattern islands 62 on the sheet 60. This results in just those regions of the recording layer shielded by islands 62 remaining DC-magnetized in the initial direction, so that these regions replicate the pattern of islands on the sheet 60 corresponding to the desired servo pattern to be transferred.

The above-described process uses a recording disk that has been previously DC-erased (DC-magnetized in one direction). However, the disk can be DC-erased in the apparatus of FIGS. 6A–6B if the permanent magnet is replaced with an electromagnet. In this case, after the disk 10 has been positioned over but not in contact with the islands 62 on sheet 60, the electromagnet is positioned beneath the sheet 60 and current is applied to the electromagnet to generate a field in the direction opposite the direction of arrows 132 (FIG. 6B). The stage 120 is rotated and because the pattern islands 62 are not in contact with the surface of disk 10 there is no magnetic shielding and thus the field from the electromagnet magnetizes all of the disk, even those regions directly opposite but not in contact with the islands 62. The process then proceeds as described previously, except that current is applied to the electromagnet in the opposite direction so that the field is applied to the disk in the direction of arrows 132.

The flexible sheet 60 is preferably a plastic film, such as PET, polyethylene naphtalate (PEN) or polyimide film, with thickness in the range between 20 and 200 microns.

Figure 7:
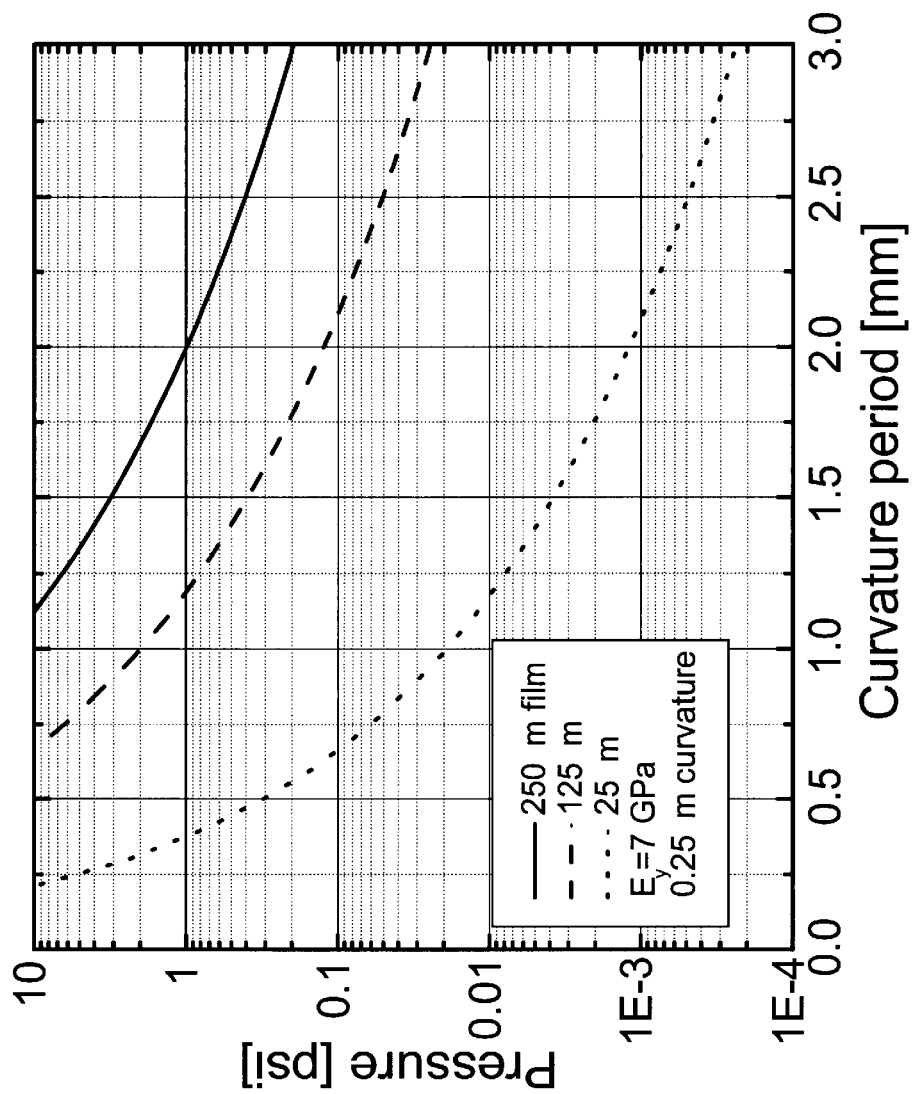
FIG. 7 is a graph of the required pressure differential on plastic sheets of PET of three different thicknesses, as a function of recording disk curvature period, for a 0.25 micron peak-to-peak axial variation.

Commercially available films suitable for the plastic sheet include Melinex 453, Melinex 725, Melinex 561, Mylar D1, and Kadanex 1000, all available from DuPont, and spin-coated polyimide films available from HD MicroSystems. The pressure difference is applied to the sheet 60 to control the degree of the contact of the islands 62 with the surface of the recording disk. It was found that a pressure in the range of between 0.1 psi and 1.5 psi above atmospheric can be used to successfully achieve contact. The pressure required to achieve contact depends on the period of curvature of the recording disk surface and the thickness and stiffness of the flexible sheet 60. FIG. 7 shows the required pressure differential on plastic sheets of PET of three different thicknesses, as a function of recording disk curvature period for a 0.25 micron peak-to-peak axial variation.

Fabrication of the Master Disk

The objective of the fabrication of the flexible sheet with the pattern islands is to produce a mechanically stable, durable master disk that can be used many times. In one method of fabrication of the plastic sheet, a polyimide solution is spin-coated onto a conventional single-crystal silicon wafer and then cured at high temperature. The cured polyimide film can then be physically removed from the wafer, or the central portion of the wafer can be removed by etching from the side opposite the polyimide film, leaving the polyimide film attached to and supported by the outer silicon ring that remains after etching. In an alternative method of fabrication of the plastic sheet, a thin plastic film of PET or PEN material is attached to a rigid substrate using an adhesive applied to one side of the plastic film. The plastic film is attached to the substrate only during the fabrication process. The adhesive may be an ultraviolet light detachable adhesive, so that if a transparent substrate (such as glass) is used, release of the plastic film from the substrate at the end of the fabrication process is achieved by irradiation with ultraviolet light through the substrate.

After the plastic sheet has been fabricated, the deposition of the magnetic shield material on the plastic sheet and its patterning into the islands is accomplished in one of two ways:

1) a) direct deposition, preferably by sputtering, of a layer of soft magnetic material on the plastic film. The material can be 160–250 nm NiFe(20/80) or NiFeCo (35/12/53) or NiFe(55/45) or NiFe(80/20) or FeCo(62/38) or other alloys of Ni, Fe and/or Co;
   b) application of a resist layer on top of the layer of soft magnetic material;
   c) lithographically exposing and developing a pattern in the resist;

d) etching of the soft magnetic material using resist as an etching mask; and e) removing the resist, leaving the desired pattern of islands of soft magnetic material.

2) a) direct deposition of a electrically conductive metallic multilayer film on the plastic film, preferably by sputtering, such as 3–5 nm Ta or Cr, followed by 30–50 nm Au or Cu, followed by 20–40 nm Ni, Fe and/or Co alloy as the seed layer for the subsequently electrodeposited soft magnetic material of Ni, Fe and/or Co alloy that will become the pattern islands;

b) application of a resist layer on top of the electrically conductive metallic multilayer;

c) lithographically exposing and developing a pattern of openings in the resist;

d) electroplating the soft magnetic material into the openings in the resist;

e) removing resist; and f) etching away the electrically conductive metallic multilayer in the areas not covered by the electroplated soft magnetic material.

A thin protective coating, such as plasma-polymerized 4 nm thick perfluorocarbon (PFC) film, can be applied over the surface of the plastic sheet and the pattern islands to improve durability and reduce water contamination.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A method of forming a pattern of magnetized regions in the magnetic recording layer of a rigid magnetic recording disk comprising:

providing a magnetic recording disk comprising a rigid substrate, a magnetic recording layer on the substrate having an annular portion magnetized in the plane of the recording layer in a first circular direction, and an outer layer on the recording layer;

providing a flexible sheet having a plurality of islands comprising magnetic shielding material extending above one of the sheet surfaces;

positioning the recording disk with the outer layer facing the islands on the flexible sheet;

applying a differential gas pressure to the flexible sheet to press the islands against the outer layer of the recording disk;

generating a magnetic field in the plane of the recording layer in a direction opposite to the first circular direction of magnetization; and moving the magnetic field around the disk to reverse the magnetization direction of the regions of the recording layer in the openings between the regions of the recording layer beneath the outer layer in contact with the islands.

2. The method of claim 1 wherein providing the recording disk comprises magnetizing the annular portion of the recording layer in the first circular direction.

3. The method of claim 2 wherein the magnet is an electromagnet, wherein magnetizing the annular portion of the recording layer in the first circular direction comprises applying electrical current to the electromagnet in a first direction, and wherein generating a magnetic field having a direction opposite to the first circular direction of magnetization comprises reversing the direction of electrical current to the electromagnet.

4. The method of claim 1 wherein the islands of magnetic shielding material are formed of low-coercivity magnetic material.

5. The method of claim 1 wherein applying the differential gas pressure comprises applying a pressure difference between the two surfaces of the flexible sheet in a range between 0.1 and 1.5 psi.

6. The method of claim 1 further comprising providing a chamber having an opening with an outer perimeter, sealing the perimeter of the chamber opening with the outer periphery of the flexible sheet with the islands located outside the chamber, and wherein applying a differential gas pressure to the flexible sheet comprises pressurizing the sealed chamber.

7. The method of claim 1 wherein the flexible sheet is a plastic film having a thickness in the range of 20 to 200 microns.

8. The method of claim 1 wherein the flexible sheet is a plastic film formed of a material selected from the group consisting of polyethylene terephtalate, polyethylene naphtalate and polyimide.

9. The method of claim 1 wherein providing a flexible sheet comprises providing a flexible sheet wherein the islands comprise a protective coating formed over the magnetic shielding material.

10. The method of claim 1 wherein positioning the recording disk with the outer layer facing the islands on the flexible sheet comprises contacting the islands of the flexible sheet with the outer layer of the recording disk.

11. A contact magnetic transfer method of forming a pattern of magnetized servo regions in the magnetic recording layer of a rigid magnetic recording disk comprising:

providing a magnetic recording disk comprising a rigid substrate, a magnetic recording layer on the substrate and including an annular portion magnetized in a first circular direction in the plane of the recording layer, and an outer layer on the recording layer;

providing a flexible plastic film having a plurality of islands comprising magnetic shielding material extending above one of the film surfaces, the islands forming a pattern representative of the servo pattern to be formed in the recording layer of the disk;

providing a chamber having an opening with an outer perimeter;

sealing the perimeter of the chamber opening with the outer periphery of the flexible plastic film with the islands located outside the chamber;

positioning the recording disk with the outer layer facing the islands on the plastic film;

pressurizing the chamber above atmospheric pressure to flex the plastic film and press the islands against the outer layer of the recording disk;

generating a magnetic field having a direction generally in the plane of the recording layer and opposite to the first circular direction of magnetization; and moving the magnetic field in a circular path around the disk to reverse the magnetization direction of the regions of the recording layer recording layer located in the openings between the regions of the recording layer beneath the outer layer in contact with the islands; whereby the regions of the recording layer beneath the outer layer of the disk in contact with the islands form the servo pattern in the recording layer of the disk.

12. The method of claim 11 wherein the magnet is an electromagnet, wherein providing the recording disk comprises magnetizing the annular portion of the recording layer in the first circular direction by applying electrical current to the electromagnet in a first direction and moving the magnet in a circular path around the disk, and wherein generating a magnetic field having a direction opposite to the first circular direction of magnetization of the disk comprises reversing the direction of electrical current to the electromagnet.

13. The method of claim 11 wherein the magnetic shielding material is a low-coercivity magnetic material comprising alloys of one or more of Ni, Fe and Co.

14. The method of claim 11 wherein the flexible plastic film has a thickness in the range of 20 to 200 microns.

15. The method of claim 11 wherein the flexible plastic film is formed of a material selected from the group consisting of polyethylene terephtalate, polyethylene naphtalate and polyimide.

16. The method of claim 11 wherein providing a flexible plastic film comprises providing a flexible plastic film wherein the islands comprise a protective coating formed over the magnetic shielding material.

17. The method of claim 11 wherein pressurizing the sealed chamber comprises pressurizing the chamber to between 0.1 and 1.5 psi above atmospheric pressure.

18. The method of claim 11 wherein moving the magnetic field in a circular path comprises locating a permanent magnet on a rotatable stage within the chamber, the magnet having a gap extending in a generally radial direction from the axis of rotation of the rotatable stage.

19. The method of claim 11 wherein positioning the recording disk with the outer layer facing the islands on the plastic film comprises contacting the islands of the plastic film with the outer layer of the recording disk.

* * * * *